No. 671,040. Patented Apr. 2, 1901.
J. T. WRIGHT.
COMBINED CULTIVATOR AND PLANTER.
(Application filed July 25, 1900.)
(No Model.) 2 Sheets—Sheet 1.
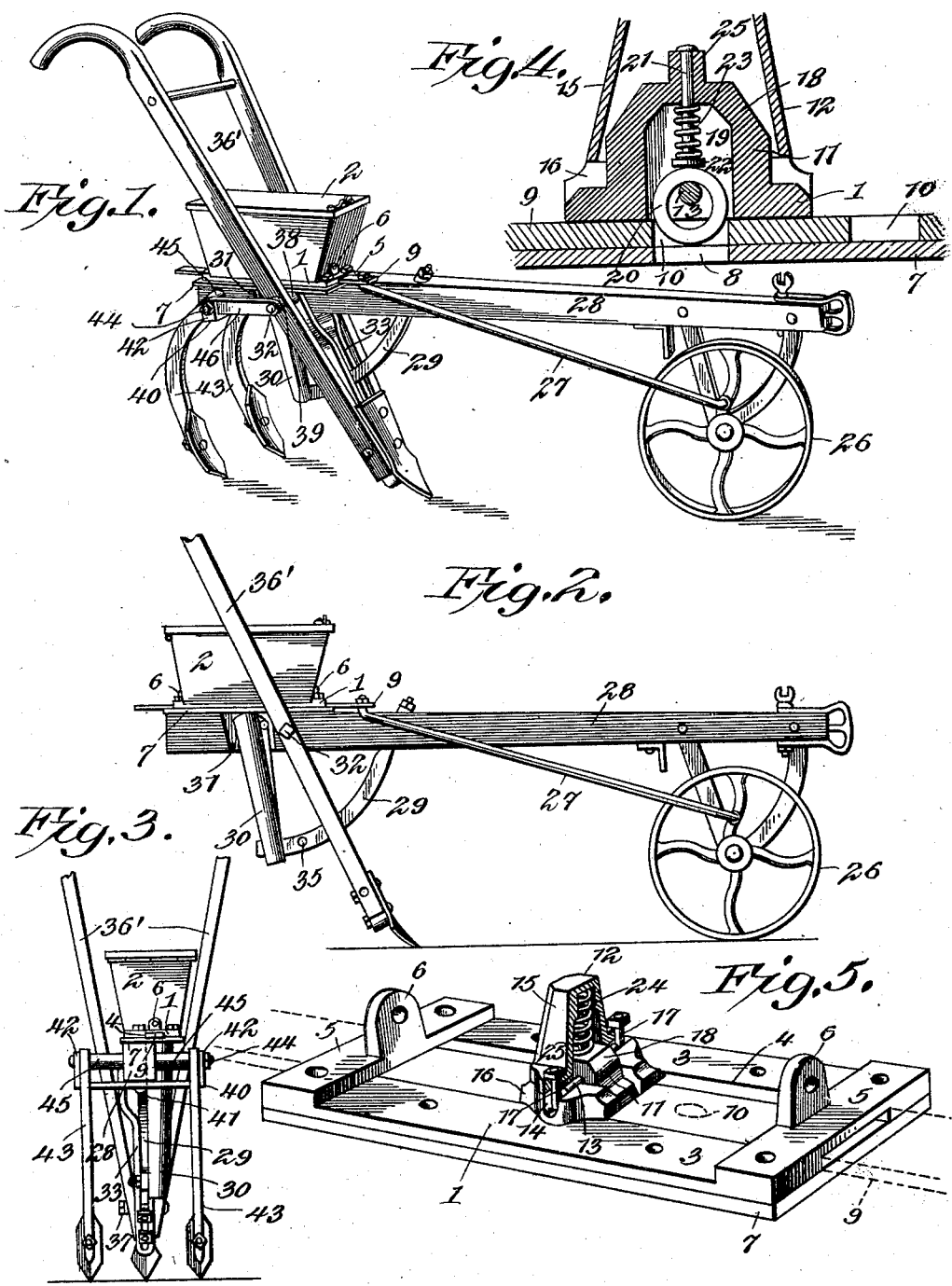
Witnesses
Howard R. Orr.
J. W. Garner
J. T. Wright, Inventor,
by C. A. Snow & Co.
Attorneys

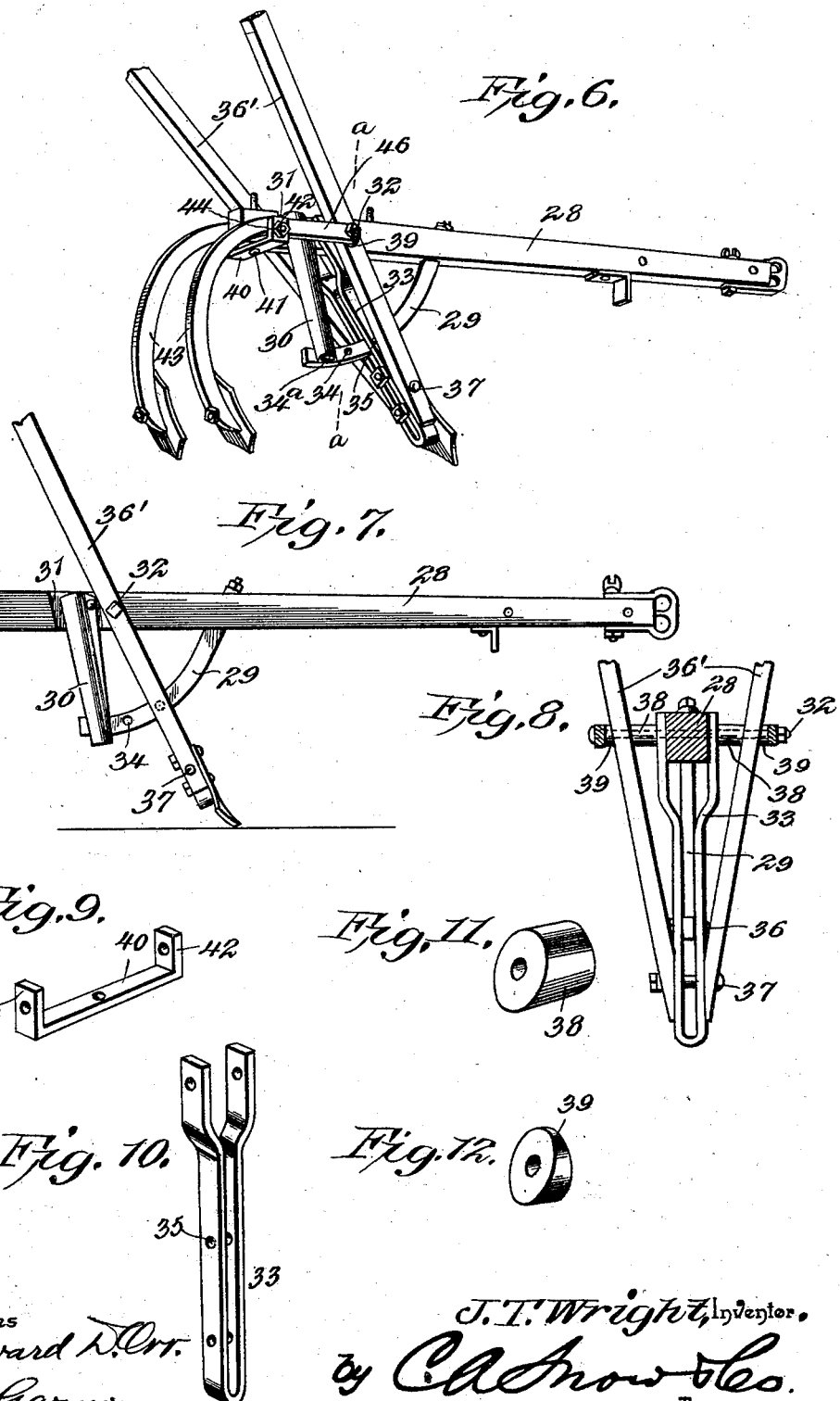

UNITED STATES PATENT OFFICE.

JOHN THOMAS WRIGHT, OF COLUMBIA, TENNESSEE.

COMBINED CULTIVATOR AND PLANTER.

SPECIFICATION forming part of Letters Patent No. 671,040, dated April 2, 1901.

Application filed July 25, 1900. Serial No. 24,805. (No model.)

*To all whom it may concern:*

Be it known that I, JOHN THOMAS WRIGHT, a citizen of the United States, residing at Columbia, in the county of Maury and State of Tennessee, have invented a new and useful Combined Cultivator and Planter, of which the following is a specification.

My invention is an improved combined cultivator and planter; and it consists in the peculiar construction and combination of devices hereinafter fully set forth, and pointed out in the claims.

In the accompanying drawings, Figure 1 is a partial perspective view of my invention, showing the same organized and adapted for operation as a corn-planter. Fig. 2 is a side elevation of the same, the covering-shovels being removed. Fig. 3 is a rear elevation of the same. Fig. 4 is a detail sectional view of the force-feed mechanism. Fig. 5 is a detail perspective view, partly in section, of the casting forming the bottom frame of the hopper and the cut-off plate and force-feed mechanism. Fig. 6 is a detail perspective view of my invention adapted for use as a triple-shovel cultivator. Fig. 7 is a side view of the same adapted for use as a single-shovel cultivator. Fig. 8 is a vertical sectional view taken on the line $a\,a$ of Fig. 6. Fig. 9 is a detail perspective view of the rear brace-bar. Fig. 10 is a similar view of the opening-standard. Fig. 11 is a similar view of one of the space-blocks. Fig. 12 is a similar view of one of the washers.

I will first describe my improvement in the planting mechanism.

A casting 1, which is of the form shown in detail in Fig. 5, forms the bottom supporting-frame of the hopper 2. The said casting comprises the parallel side plates 3, forming a guideway 4 between them, and cross-plates 5, which connect the ends of the side plates. While it is more economical to cast the side plates and cross-plates integrally, it will be understood that the same may be separately formed and secured together by screws or other devices, and I do not limit myself in this particular, although I will adhere throughout the specification in the designation of the part 1 as the "casting." On the upper sides of the cross-plates 5, at the centers thereof, are upwardly-extending ears 6. The side and end walls of the hopper rest upon the casting 1, the end walls of the hopper, at their lower sides, being disposed between the cross-plates 5, and the said lugs or ears 6 bearing against said end walls and secured thereto by suitable screws or bolts. A bottom plate 7 is secured on the lower side of the casting 1 and is provided with a central discharge-opening 8, through which the seeds are forced by the means and in the manner hereinafter described. The seed-slide 9 operates in the guide 4, formed between the side plates 3, the bottom plates 7, and the cross-plates 5. The said seed-slide is provided with any suitable number of seed-openings 10, of suitable size, adapted to hold a suitable number of seed—as of corn, peas, beans, or the like—and the said seed-openings 10 of the slide successively register with the discharge-opening 8 of the bottom plate when the seed-slide is reciprocated, as will be understood. A vertically-movable cut-off 11 bears upon the upper side of the seed-slide, over the opening 8. The said vertically-movable cut-off operates in an inclosing cap 12, and said cut-off is provided with a shaft-pin 13, which extends transversely through the same and the ends of which project beyond the sides of the cut-off and operate in vertical slots 14 in the cap 12. The cap may be composed of a single piece of metal of suitable shape bolted on the casting 1 and disposed transversely with relation thereto, or, as shown in Fig. 5, the cap may be composed of the upper section 15 and the lower or base sections 16, the latter being lugs formed integrally with the casting 1 and provided with the slots 14. In this construction the upper section of the cap is secured on the base sections or lugs by bolts 17. The cut-off 11 is provided on its upper side with a vertical extension or boss 18, in the under side of which is a vertical recess 19, through which the shaft-pin 13 extends. A ring-shaped force-feed roller 20 operates in the lower portion of said recess, the shaft-pin 13 extending through the said roller and limiting the vertical movement of the latter. A vertically-movable pin 21 has the upper portion of its shank guided in the upper end of the boss 18 and has an enlarged head 22 at its lower end. A spring 23 on the lower portion of the said pin exerts downward pressure on the roller 20 and causes the latter when a seed-opening 10 registers with the opening 8 to move downward in said openings and force such seeds as are carried in the seed-openings through the opening 8. The cut-off 11 is pressed downward and kept normally in contact with the feed-slide 9 by a spring 24, which is disposed in the cap 15 and bears upon the upper side of the boss 18, the lower end of the said spring being retained in place on the boss by a centering projection 25, with which the latter is provided on its upper side. While the cut-off is thus held normally in contact with the upper side of the seed-slide, it is adapted to rise vertically a slight distance to clear seeds which may project slightly above the upper surface of the seed-slide, and hence avoid cutting and injuring the seed, while efficiently preventing more than the requisite number of seeds from being carried by a seed-opening 10 to the discharge-opening 8. To facilitate the clearance of the seeds, the cut-off, being provided with the shaft-pin 13, which forms a pivot as well as a vertical guide for the cut-off, is adapted to rock or oscillate slightly.

As shown in Figs. 1 and 2, the planter is provided with an operating-wheel 26, which is connected to the seed-slide 9 by a pitman 27. The seed-slide may, however, be operated by other suitable means, and I do not limit myself in this particular.

I will now describe my improvement in the cultivator which adapts the same to be used either in connection with the planting mechanism or when the latter is detached for cultivating purposes only.

The beam 28, while here shown as of wedge shape, may be of any suitable preferred construction. A curved brace-bar 29 is attached at its front end to the beam and extends through the same, as shown, and the said curved brace-bar extends rearward under the rear portion of the beam. On the upper side of the latter the hopper and the seed-dropping mechanism hereinbefore described are adapted to be secured, as will be understood from the drawings. A seed-spout 30 has its upper end secured in a rabbet 31 in one side of the beam. The said seed-spout depends therefrom, and its lower end is adjustably secured to the rear end of the curved brace-bar 29 by a bolt 34ᵃ and adjusting-openings 34, with which said brace-bar is provided. A bolt 32 of considerable length extends transversely through the beam at a slight distance in advance of the seed-spout. On the said bolt are secured the bifurcated upper ends of a substantially U-shaped opening-standard 33, the upper end of the said standard being disposed on opposite sides of the beam. A bolt 36, inserted in the front opening 34 and in openings in the opening-standard, secures said standard to the brace-bar, as shown. A pair of handle-levers 36' are secured on the bolt 32, and the lower ends of the said handle-levers are bolted to opposite sides of the opening-standard, near the foot of the latter, as shown at 37. Space-blocks 38 are placed on the said bolt 32, between the opening-standard and the inner sides of the handle-levers, to dispose the latter at the requisite distance from the beam, and washers 39 are placed on the said bolt and bear against the outer sides of the said handle-levers. The bolt 32 is provided at one end with the usual head and at the other end with the usual cap or nut, as shown. A suitable point, shovel, or tongue may be secured to the opening-standard by any suitable means, and the same is adapted to open the furrows for the seed when my invention is used as a planter. My invention is shown thus organized in Fig. 2 of the drawings. I also provide a brace-bar 40, which is adapted to be disposed transversely under the beam 28, at the rear end thereof, and secured thereto by a bolt 41, which extends through the center of said brace-bar. The latter has its ends upturned, as at 42. In connection with the rear brace-bar 40 I provide a pair of standards 43, which are of the form shown and are bolted on the inner sides of the upturned ends of the rear brace-bar 40 by a bolt 44, which extends transversely through the beam 28. Suitable space-blocks 45 are placed on the said bolt between the sides of the beam and the inner sides of said standards. The latter are provided with forward-extending arms 46, which are secured on the bolt 32, as shown. The said standards 43 may be equipped with suitable plates, tongues, or shovels to serve as coverers when the machine is used as a planter or such suitable cultivating points, tongues, or shovels when the same is used as a cultivator. It will be understood that when the standards 43 are removed, as well as the planting mechanism, as shown in Fig. 7, my invention is adapted for use as a single-shovel cultivator. When the said standards 43 are attached and the seed-planting mechanism removed, as shown in Fig. 6, my invention is adapted for use as a triple-shovel cultivator.

Having thus described my invention, I claim—

1. In combination with the reciprocating seed-slide and the casting in which the same is guided, the cap secured on said casting, the vertically-movable cut-off housed in said cap and having the bearing-pin, the ends of which operate in vertical slots in the sides of said cap, and a spring in said cap bearing downward on said cut-off, substantially as described.

2. In combination with the reciprocating seed-slide and the casting in which the same is guided, the cap secured on said casting, the vertically-movable cut-off housed in said cap and having the bearing-pin, the ends of which operate in vertical slots in the sides of said cap, a spring in said cap bearing downward on said cut-off, the force-feed ring in a recess on the under side of the cut-off, and on said pin, and a spring bearing downward on said force-feed ring, substantially as described.

3. The combination of a seed-slide, the casting forming a guide therefor, the vertically-movable cut-off having pivotal bearings, a spring bearing downward on said cut-off, the force-feed ring in a recess in the under side of the cut-off, a pin extending through said ring to retain the latter in the cut-off and a spring bearing downward on said ring, substantially as described.

4. The combination of the bottom plate having a discharge-opening, the casting on said bottom plate and comprising the side plates 3 and cross-plates 5 at the ends thereof, said side and cross plates together with the bottom plate forming guideways, the seed-slide in said guideways, the spring-depressed cut-off bearing on said seed-slide, and the spring-depressed force-feed ring in said cut-off, substantially as described.

5. In a planter, the combination of a seed-dropping mechanism, the beam, the seed-spout having its upper end pivoted to said beam, the curved brace-rod 29 secured to and depending from the beam, and to which the lower end of the seed-spout is adjustably secured, so that the lower end of said seed-spout may be adjusted forward or back on said brace-rod, and the furrow-opener secured to said beam and brace-rod, whereby the lower end of the seed-spout is adjustable in rear of and independently of the furrow-opener, substantially as described.

6. The combination with the beam and opening-standard, of the handles having their lower ends secured to said opening-standard, the bolt 32 securing the upper portion of the standard to the beam and passing through said handles, the transversely-disposed brace-bar 40 at the rear of the beam, and the covering-standards secured to said brace-bar, and having the forward-extending arms secured on the said bolt 32, substantially as described.

7. The combination of the beam, the opening-standard, the handles having their lower ends secured to said opening-standard, the bolt 32 securing the upper portion of the standard to the beam and passing through said handles, space-blocks on said bolt, on the inner sides of said handles, the transversely-disposed brace-bar at the rear of the beam, and the covering-standards secured to said brace-bar and having the forward-extending arms secured on said bolt 32, on the outer sides of said handles, substantially as described.

In testimony that I claim the foregoing as my own I have hereto affixed my signature in the presence of two witnesses.

JOHN THOMAS WRIGHT.

Witnesses:
　A. O. P. NICHOLSON, Jr.,
　C. A. MCALPINE.